July 17, 1934.  F. COYLE ET AL  1,966,976
LOCKING DEVICE FOR AUTOMOBILE ENGINE HOODS
Filed Oct. 18, 1933  3 Sheets-Sheet 1
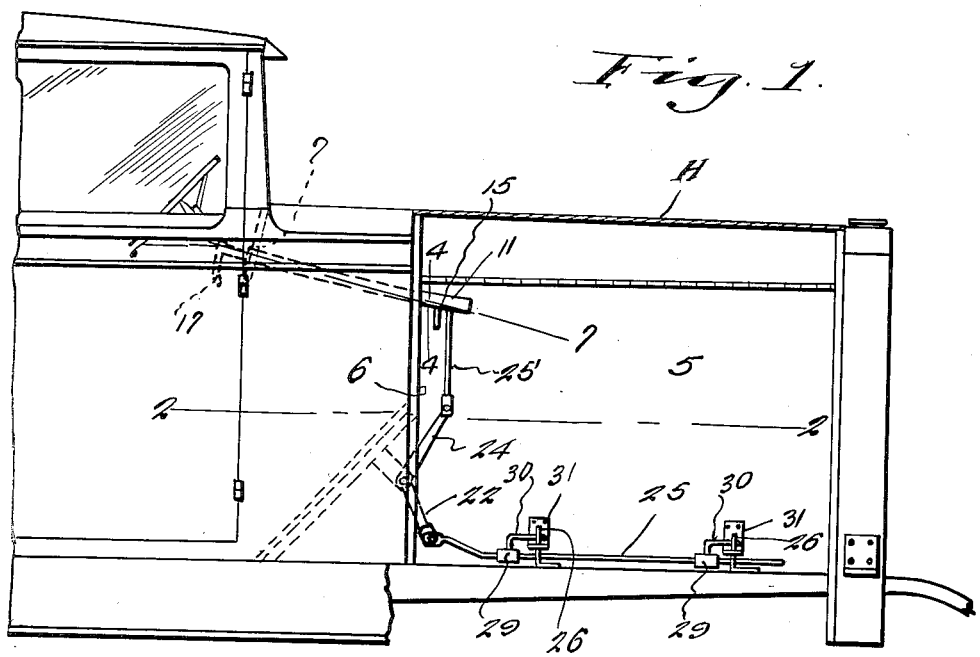
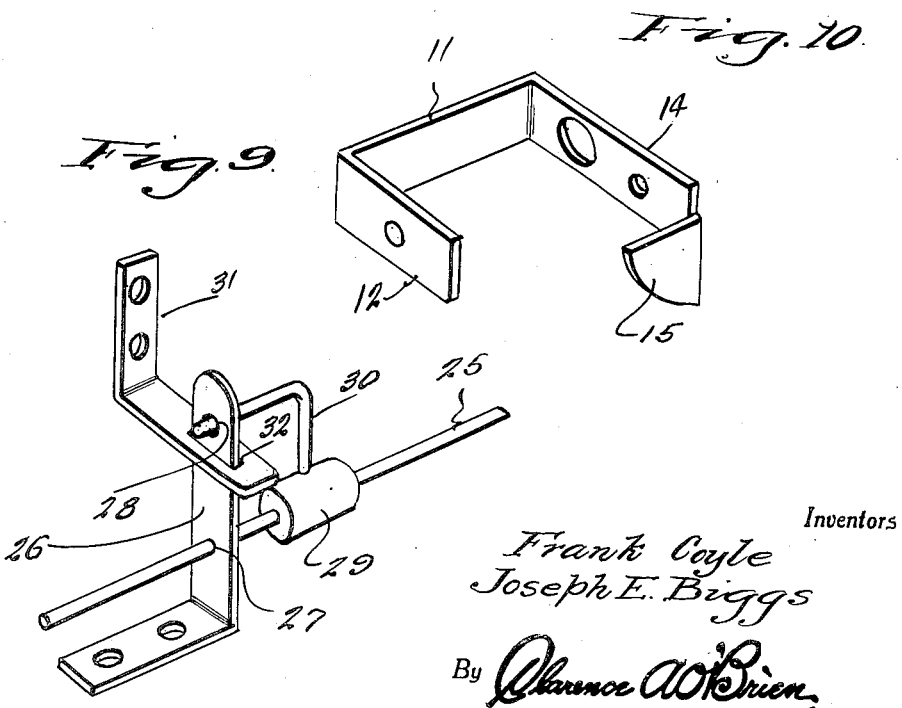
Inventors
Frank Coyle
Joseph E. Biggs
By Clarence A. O'Brien
Attorney

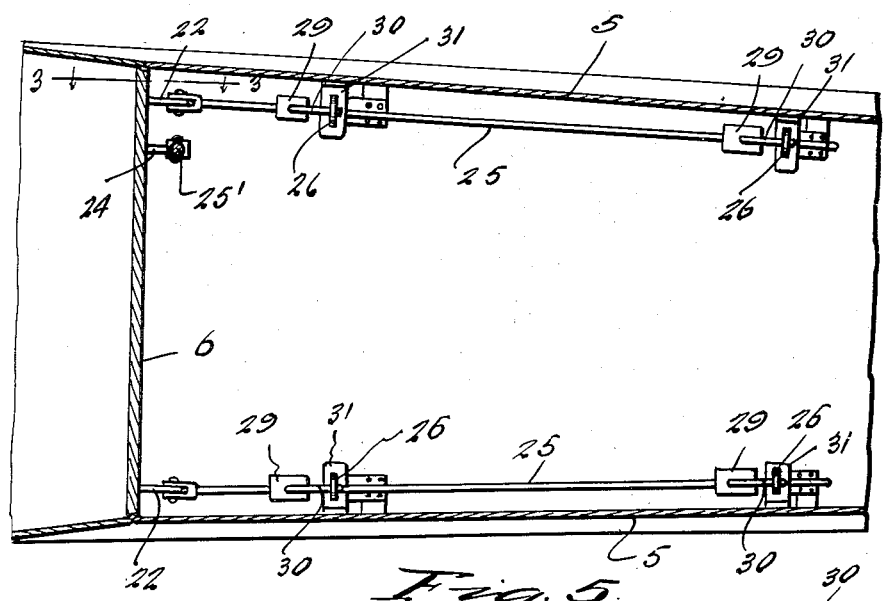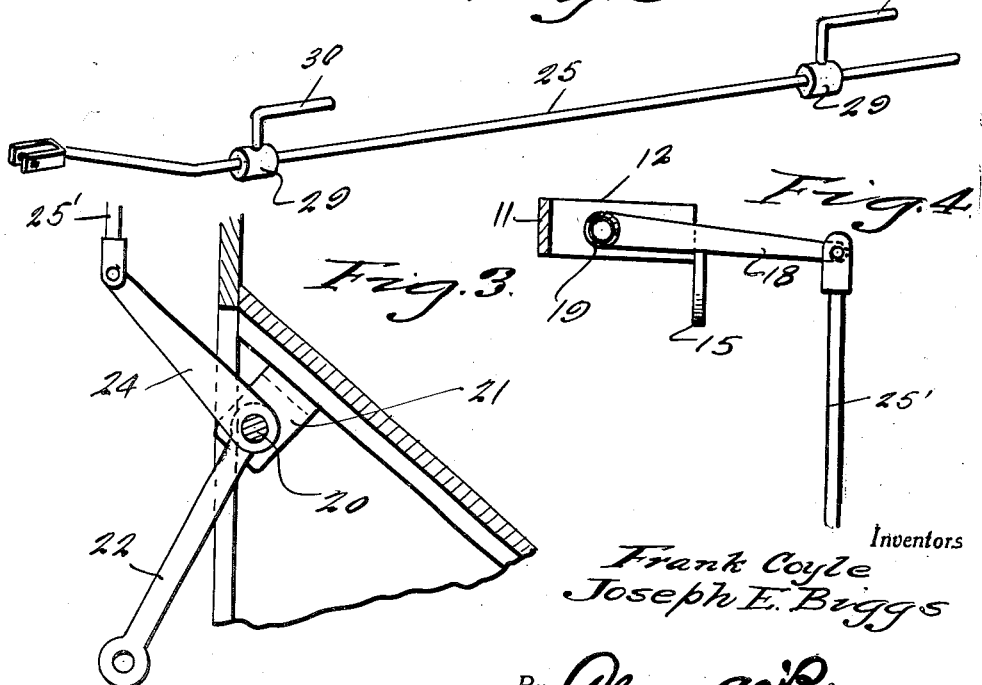

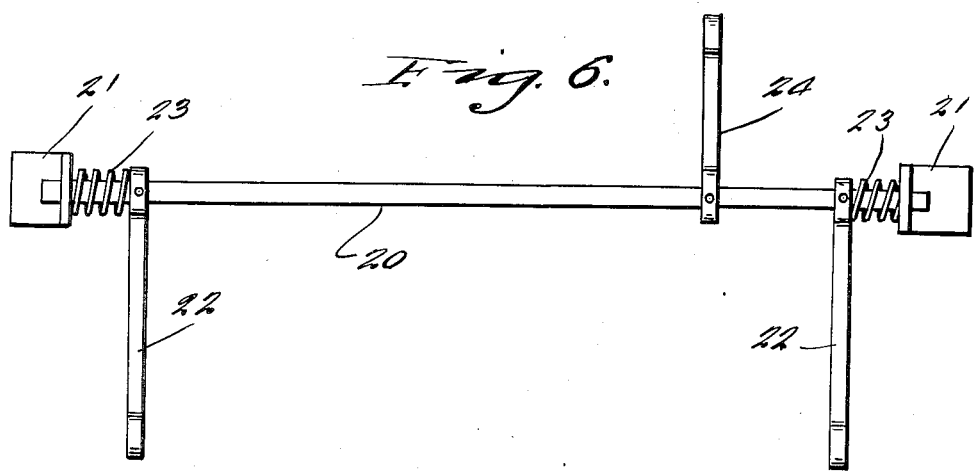
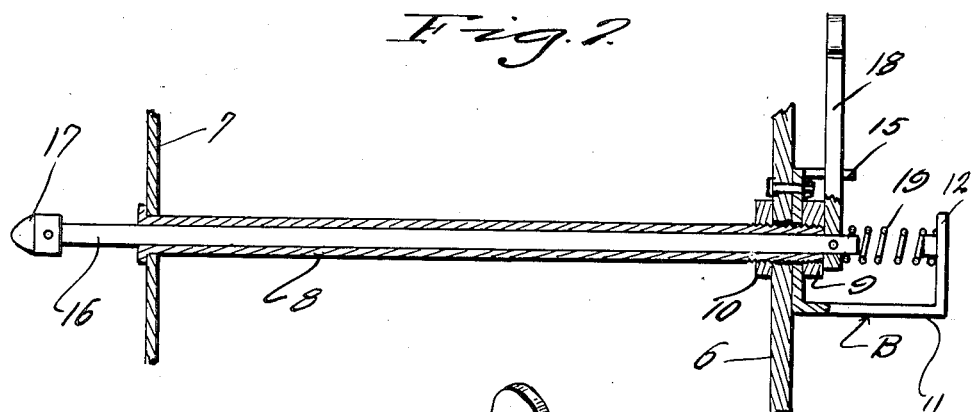
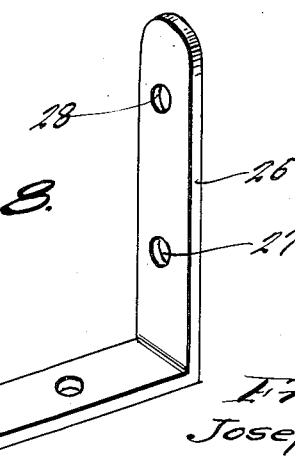
Inventors
Frank Coyle
Joseph E. Biggs

Patented July 17, 1934

1,966,976

UNITED STATES PATENT OFFICE 1,966,976

LOCKING DEVICE FOR AUTOMOBILE ENGINE HOODS

Frank Coyle and Joseph Emerson Biggs, Niagara Falls, N. Y.

Application October 18, 1933, Serial No. 694,167

1 Claim. (Cl. 292—36)

The present invention relates to locking devices for engine hoods of automobiles and has for an object to provide an improved construction wherein the hood may be locked or unlocked manually from a position adjacent the dashboard.

Another very important object of the invention resides in the provision of a device of this nature which is simple in its construction, inexpensive to manufacture and install, durable, compact and convenient in its arrangement of parts and thoroughly efficient and reliable in use and operation.

With the above and numerous other objects in view as will appear as the description proceeds, the invention consists in certain novel features of construction, and in the combination and arrangement of parts as will be hereinafter more fully described and claimed.

In the drawings:

Figure 1 is a fragmentary side elevation of an automobile body showing the hood in section to illustrate an application of the locking device.

Figure 2 is a longitudinal horizontal section taken substantially on the line 2—2 of Figure 1.

Figure 3 is a detail vertical section taken substantially on the line 3—3 of Figure 2.

Figure 4 is a detail section taken substantially on the line 4—4 of Figure 1.

Figure 5 is a perspective view of one of the locking rods.

Figure 6 is a detail elevation of the operating shaft.

Figure 7 is a detail section taken substantially on the line 7—7 of Figure 1.

Figure 8 is a perspective view of one of the brackets rising from the frame.

Figure 9 is an other perspective thereof showing the same cooperatively associated with one of the hood brackets, a locking pin and a locking rod.

Figure 10 is a perspective view of the dashboard bracket.

Referring to the drawings in detail it will be seen that numerals 5 denote the hinged sections of an automobile engine hood H. Numeral 6 denotes the dashboard and numeral 7 denotes the instrument board. A tube 8 extends through openings in the dashboard 6 and the instrument board 7 as shown to advantage in Figure 7. A U-shaped bracket B is mounted on the forward end of this tube 8 by means of a nut 9 threaded on the tube. A nut 10 is also threaded on the tube but on the rear side of the dashboard 6. These two nuts hold the tube secure in place. The bracket B, as mentioned above, is substantially U-shaped comprising a cross member 11 and sides 12 and 14 the latter being slightly longer than the former and having an inwardly directed extension which will be referred to hereinafter as a stop and is denoted by numeral 15. A bar 16 is slidable and rockably mounted in the tube 8 and has a suitable handle or crank 17 on the end adjacent the instrument board 7 for the manipulation of this bar 16. On the other end of this bar there is fixed a crank 18 normally resting on the stop 15. A spring 19 is mounted between the side 12 and the crank 18 to normally hold the bar 16 in the position shown in Figure 7 but of course the bar 16 may be slid forwardly against the tension of the spring 19 and then rock to swing the crank 18 for a purpose which will appear later.

A shaft 20 is rockably mounted in brackets 21 preferably secured under the footboards of the automobile. A pair of cranks 22 are secured to the shaft 20 one adjacent each bracket 21 and springs 23 are disposed about the shaft 20 to impinge against cranks 22 and the brackets 21. A crank 24 is fixed on an intermediate portion of the shaft 20 between the cranks 22 and is operatively connected with the crank 18 by a link 25' so that when the bar 16 is rocked the shaft 20 is rocked to swing the cranks 22.

A pair of rods 25 are slidably mounted in the upstanding legs of L-shaped brackets 26 which legs are provided with openings 27 for this purpose. The upstanding legs of the brackets 26 are also provided with openings 28. These brackets 26 are mounted on the sides of the frame of the automobile. On each rod 25 there is mounted frictionally a pair of blocks 29 having L-shaped pins 30 rising therefrom. On each side 5 of the hood H, adjacent the lower edges thereof and on the inner faces thereof are L-shaped brackets 31 the inwardly directed legs of which are provided with slots 32 to receive the upper end portions of the upstanding legs of the brackets 26. The pins 30 are adapted to engage in the openings 28 thereby preventing the lifting of the sides 5 when the bar 16 is in its normal position shown particularly in Figure 7. Therefore it is impossible to open the hood of the automobile unless one has access to the interior of the automobile so as to obtain access to the knob or crank 17. An authorized person, of course, may push the knob or handle 17 forwardly thereby pushing the bar 16 forwardly to free the crank 18 of the stop 15 and then by turning the knob 17 causing the rocking of the bar 16 thereby causing the rocking of the shaft 20 and the cranks 22 thereon will pull the rods 25 rearwardly to release the pins 30 from the openings 28 and then the sides of the hood may be raised. The rods 25 and the link 25' have sufficient flexibility to take care of the arc described by the various cranks.

It is thought that the construction, operation, utility and advantages of this invention will now be clearly understood by those skilled in this art.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

Operating means for a locking device for a hood of a motor vehicle comprising a rock shaft connected with the locking device to acuate the same, a substantially U-shaped bracket supported within the hood by one limb of the bracket, said limb having an inwardly extending projection at its end forming a rest, a manually operated rod supported for sliding and rotary movement in a part of the vehicle and having its forward end passing through said limb of the bracket, an arm on said end, a coiled spring having one end supported by the other limb of the bracket and its opposite end fitting over the forward end of the rod and bearing against the arm, said spring normally holding said rod in a position with the arm resting on the projection, but permitting the rod to be pushed forwardly to free the arm, and means for connecting said arm to the rock shaft, whereby partial rotation of the rod will cause the arm to rock the shaft to move the locking device to latching or releasing position.

FRANK COYLE.
JOSEPH EMERSON BIGGS.